United States Patent [19]
Cheng

[11] Patent Number: 6,019,680
[45] Date of Patent: Feb. 1, 2000

[54] MANIPULATOR FOR EFFECTIVELY CONTROLLING TELEVISION GAMES SETS (TV GAMES SETS)

[75] Inventor: Chiu Hao Cheng, Miao-Li Hsien, Taiwan

[73] Assignee: Top Games & Company, Taipei, Taiwan

[21] Appl. No.: 08/964,753

[22] Filed: Nov. 5, 1997

[30] Foreign Application Priority Data

Jun. 14, 1997 [CN] China ................................. 86209814

[51] Int. Cl.⁷ .................................................. A63F 9/22
[52] U.S. Cl. ........................................ 463/37; 273/148 B
[58] Field of Search ................................. 463/36, 37, 38; 273/148 B

[56] References Cited

U.S. PATENT DOCUMENTS

| | | | |
|---|---|---|---|
| 4,246,452 | 1/1981 | Chandler | 273/148 B X |
| 4,552,360 | 11/1985 | Bramley | 463/38 |
| 4,588,187 | 5/1986 | Dell | 273/148 B |
| 5,645,277 | 7/1977 | Cheng | 273/148 B |
| 5,670,988 | 9/1997 | Tickle | 463/37 X |
| 5,786,807 | 7/1998 | Couch et al. | 273/148 B |
| 5,820,462 | 10/1998 | Yokloi et al. | 463/37 |

*Primary Examiner*—Michael O'Neill
*Attorney, Agent, or Firm*—Dougherty & Troxelly

[57] ABSTRACT

A manipulator for controlling TV game sets suitable for manipulating various kinds of games by means of variety of control modules with simple functions combined together in a control box. A user does not have to prepare large amount of control modules in order to manipulate different types of TV game set and enable him to save money.

9 Claims, 6 Drawing Sheets

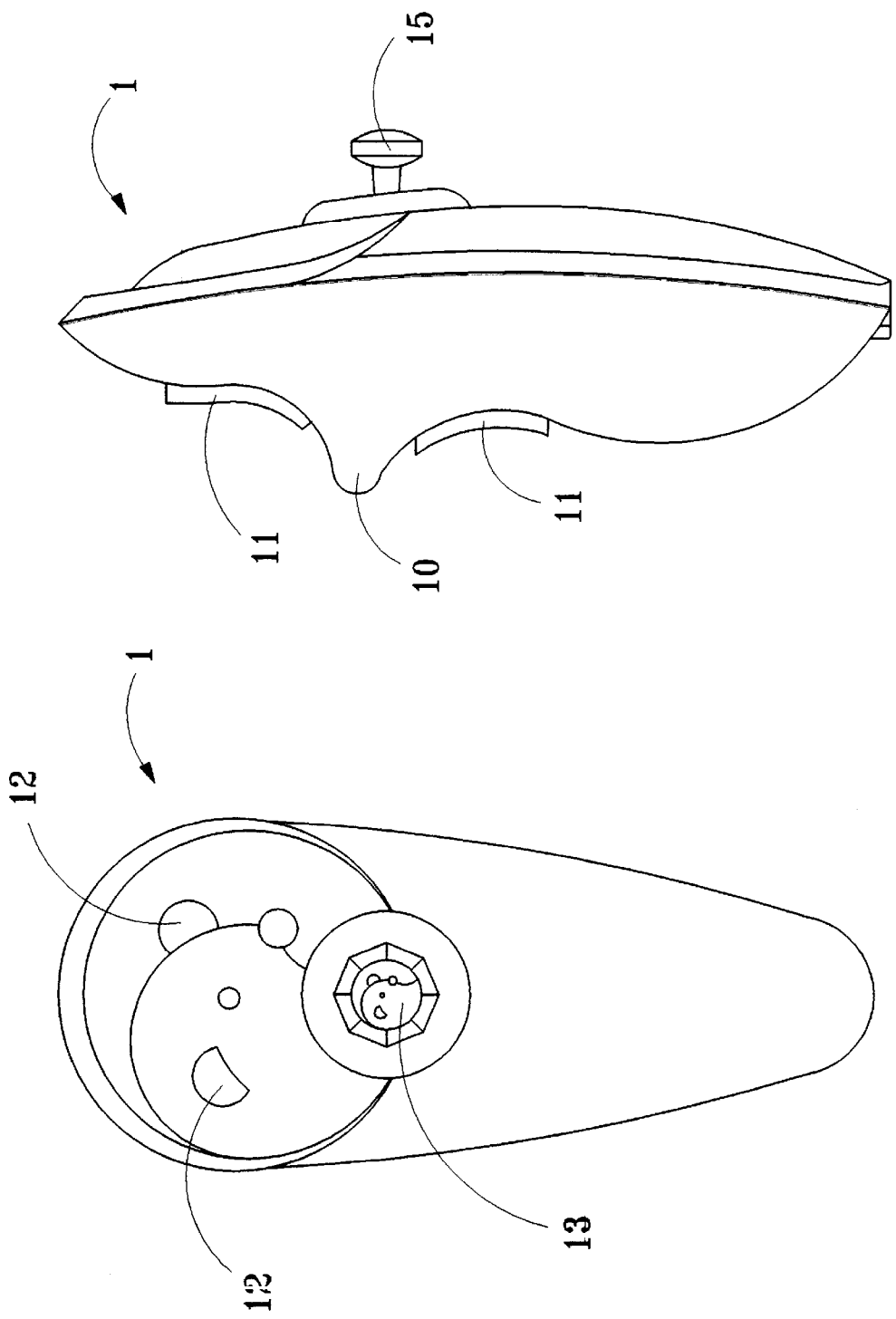

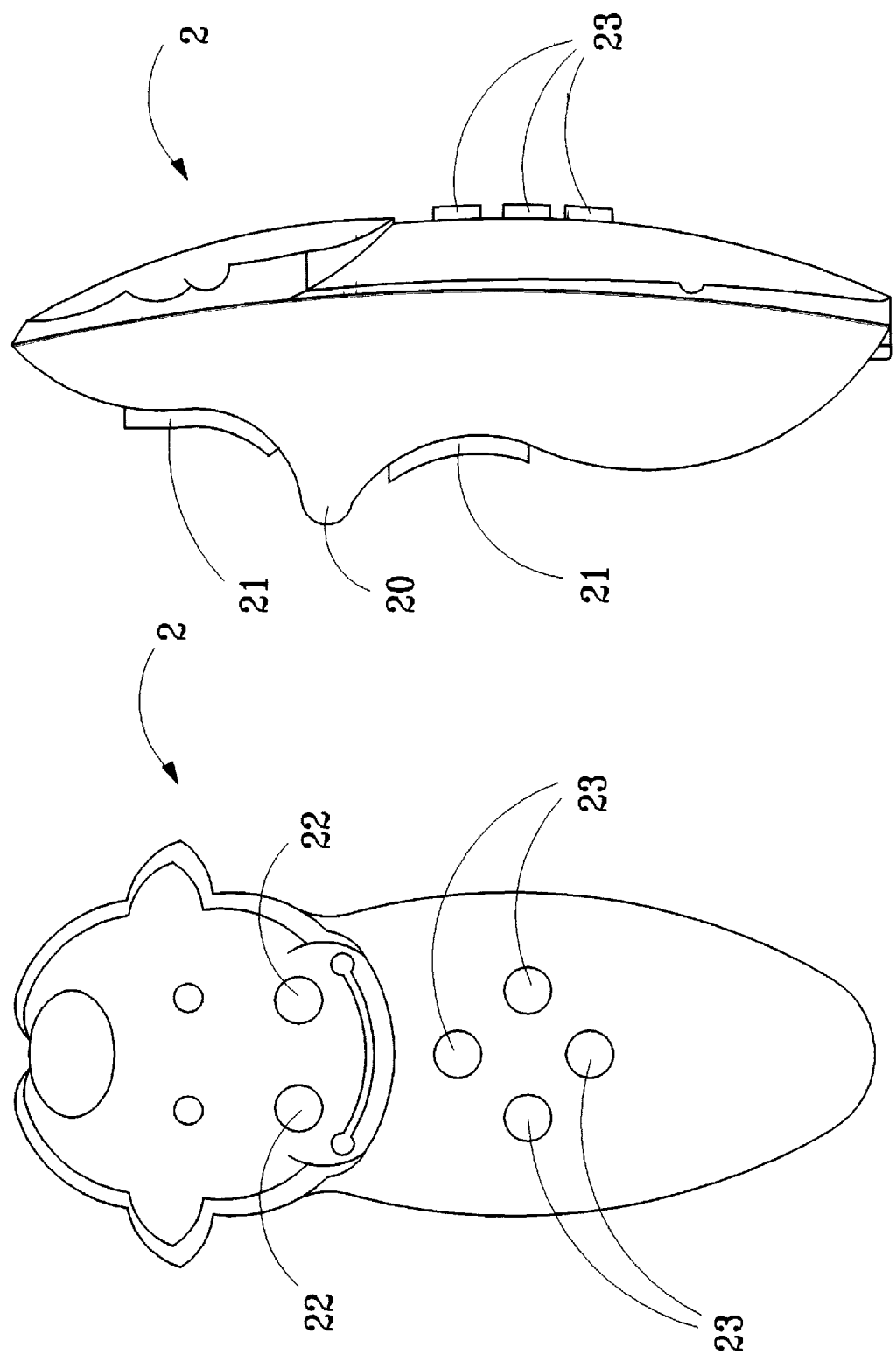

MANIPULATOR FOR EFFECTIVELY CONTROLLING TELEVISION GAMES SETS (TV GAMES SETS)

BACKGROUND OF THE INVENTION

1. Field of the Invention

The present invention relates to a manipulator for effectively controlling television game sets, and more particularly, to a simple constructed, space saving, convenient and versatile manipulator for controlling television game sets.

2. Description of the Prior Art

The progress of television game set technology has been very astonishing since the day a primitive eight bit module was developed. Now the related periphery equipment such as rocking bar, flying bar, sliding mouse or index controller are so popular to cooperate with various kinds of television game set or their soft wares causing user's difficulty in selecting a suitable set for himself to enjoy. Besides, incompatibility between the operation modes of different manufacturer products bring another problem to the user that he has to spend more money to purchase the manipulators of different manufacturers.

SUMMARY OF THE INVENTION

It is an object of the present invention to provide a manipulator for TV game sets in which a conventional complicated control module is simplified to a plurality of control element having a single function, by combination of each control element having a single function, a manipulator which is able to manipulate different TV game sets may be obtained.

It is another object of the present invention to provide a convenient and versatile manipulator for effectively controlling TV game sets, wherein similar to the interface circuits in a computer, various electrical circuit elements are installed in different cassettes respectively, and by proper combination of them with associated control apparatus, a manipulator constructed as such can be used to control the operation of different TV game sets.

It is a further object of the present invention to provide a convenient and versatile manipulator for effectively controlling TV game sets by combining operation of several control modules wherein the user may select any desired TV game without the need of preparing any additional device or equipment.

It is one more object of the present invention to provide a manipulator as described above which can be used by a left hander conveniently as is used by an ordinary people so that no special auxiliary means are required.

To achieve these objects and other advantages of the manipulator of the present invention, the applicant who is well experienced in the related arts for many years, intending to overcome the disadvantages of the conventional products, and through a long term efforts in studying and experiment, finally has succeeded to develop a convenient and versatile manipulator for TV game sets as described above and is now going to be disclosed hereinafter.

BRIEF DESCRIPTION OF THE DRAWINGS

The invention, as well as its many advantages, may be further understood by the following detailed description and drawings in which:

FIG. 1 is a front view of the first control module of the present invention;

FIG. 1A is a side view of the first control module of the present invention;

FIG. 2 is a front view of the second control module of the present invention;

FIG. 2A is a side view of the second control module of the present invention;

Figure 3A:
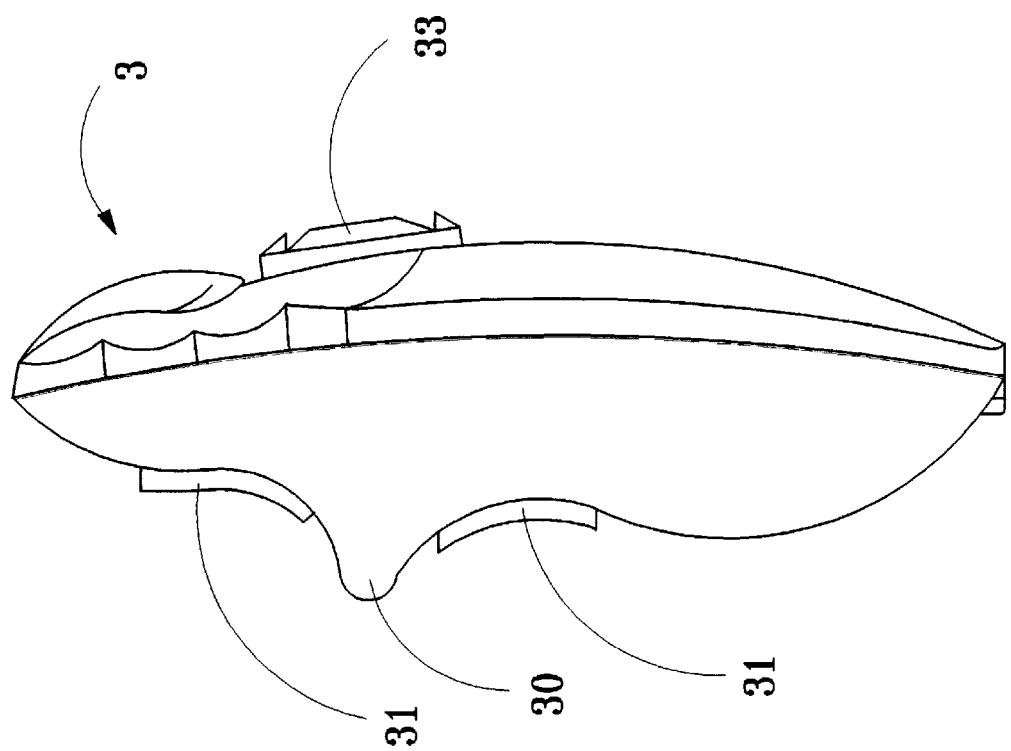
FIG. 3A is a side view of the third control module of the present invention.

Numeral symbols in the drawings are as follows;
1: first control module
2: second control module
3: third control module
4: control box
5: TV game set
10: protruding portion
11: control button
12: functional button
13: rocking bar
20: protruding portion
21: control button
22: functional button
23: operational button
30: protruding portion
31: control button
32: functional button
33: index controller
40: control module terminal

Detailed Description of the Preferred Embodiment

Referring to FIG. 1A, which is the first control module 1 of the present invention with an appearance in a mouse face profile on which there is a rocking bar 13 for controlling the picture position of a TV game set. Two functional buttons 12 are provided in front of the rocking bar 13 for manipulating the functional operation such as selection or beginning. At the back surface of the first control module, there is a protruding portion 10 with two control buttons 11 installed at its front and rear sides respectively for enlarging the function of the first control module 1. When the first control module 1 is in use, the rocking bar 13 and functional buttons 12 are operated by the user's thumb, while the body of the first control module 1 is held by his other four fingers, and the control buttons 11 at the back surface of the first control module 1 can also be pressed by two of the these four fingers. The individual motion of these four fingers is isolated by the protruding portion 10 so as to prevent miss touching other buttons when in operation.

Referring to FIGS. 2 and 2A which are a front view and a side view of the second control module 2 of the present invention respectively, the second control module 2 forms in a cow face profile containing a group of the control buttons. Operational buttons 23 provided on its surface are the main buttons for operating the TV game set. As those on the first control module 1, two functional buttons 22 are provided in the front portion of the second control module 2 for manipulating the functional operation such as selection or beginning. On the back surface of the second control module 2, there is also a protruding portion 20 with two control buttons 21 installed at its front and rear sides respectively for enlarging the function of the second control module 2. When the second control module 2 is in use, the operational buttons 23 and functional buttons 22 are pressed by the user's thumb, while the body of the second control module 2 is held by his other four fingers, and the control buttons 21 at the back surface of the second control module 2 can also be pressed by two of these four fingers. The individual motion of these four fingers is isolated by the protruding portion 20 so as to prevent miss touching other buttons when in operation.

Figure 3:
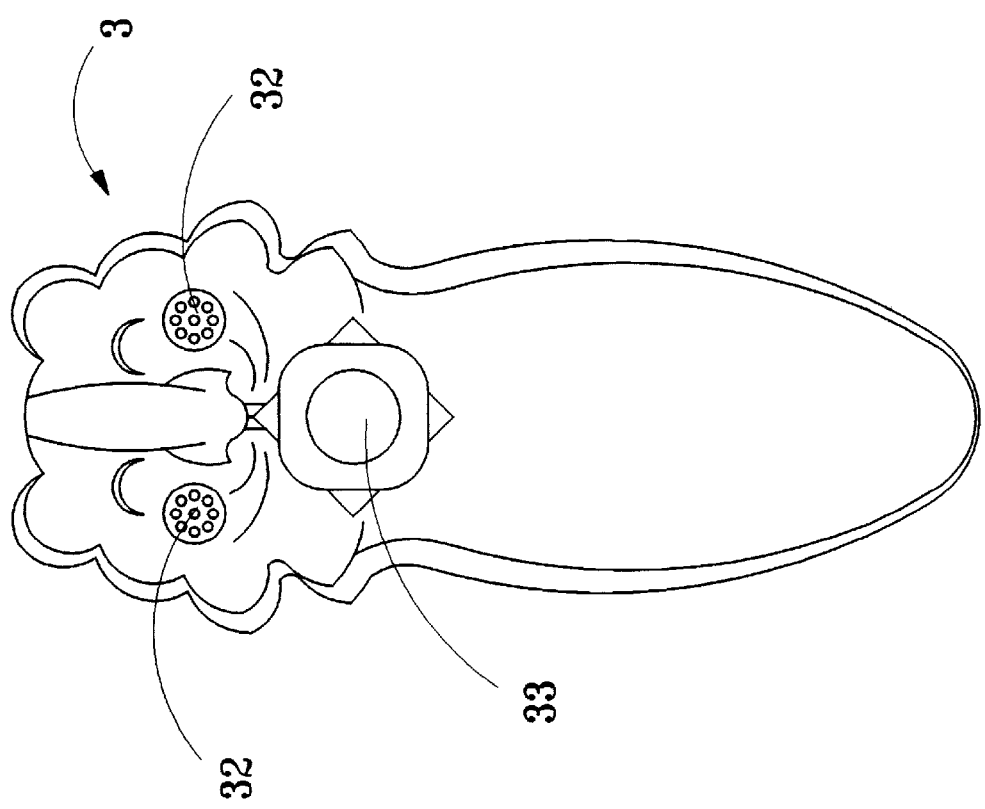
FIG. 3 is a front view of the third control module of the present invention.

Referring to FIGS. 3 and 3A which are a front view and a side view of the third control module 3 of the present invention respectively, it is principally an indicating device. The third control module 3 forms in a tiger face profile with an index controller 33 provided on it for controlling picture moving on the screen. Two functional buttons 32 are installed at the front portion of the third control module 3 for manipulating the functional operation such as selection or beginning. On the back surface of the third control module 3, there is also a protruding portion 30 with two control buttons 31 installed at its front and rear sides respectively for enlarging the function of the third control module 3. When the third control module is in use, it is held by the user's hand with the index controller 33 and the functional buttons 32 operated by his thumb, while the body of the third control module 3 is held by his other four fingers and the two control buttons 31 at the back surface of the third control module 3 can be operated by two of these four fingers. The individual motion of these four fingers is isolated by the protruding portion 30 so as to prevent miss touching other buttons when in operation.

Figure 4:
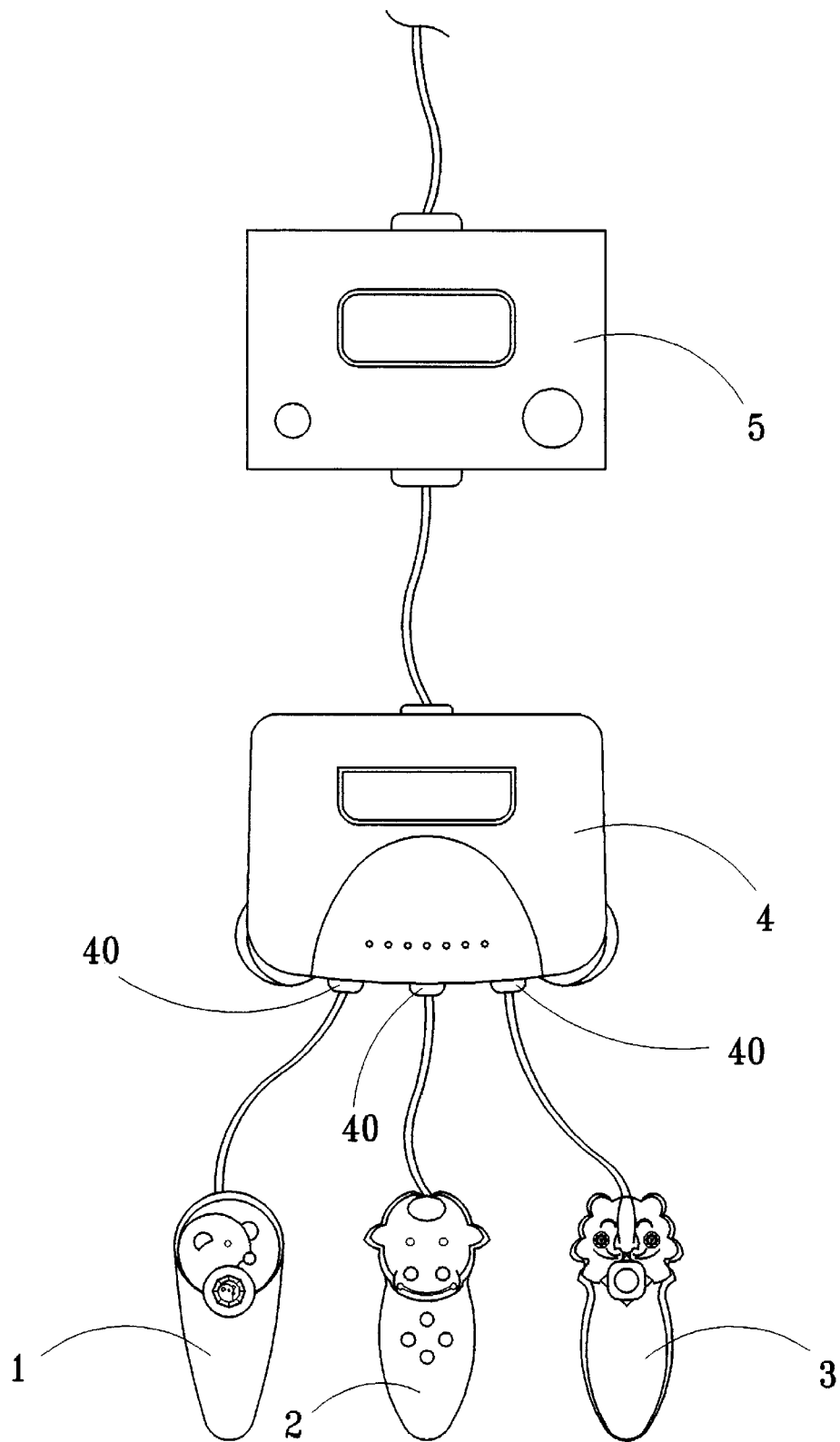
FIG. 4 is a drawing showing the manipulator of the present invention in an preferred embodiment.

Referring to FIG. 4, which is a drawing showing the manipulator of the present invention in an preferred embodiment, wherein the first, second and third control modules 1,2 and 3 and the TV game set 5 are combined in a control box 4 with a connecting circuit installed in it. Several control module terminals 40 are extended out of the control box 4 for connecting with the first, second and third control modules 1,2 and 3 or others if any.

Figure 5:
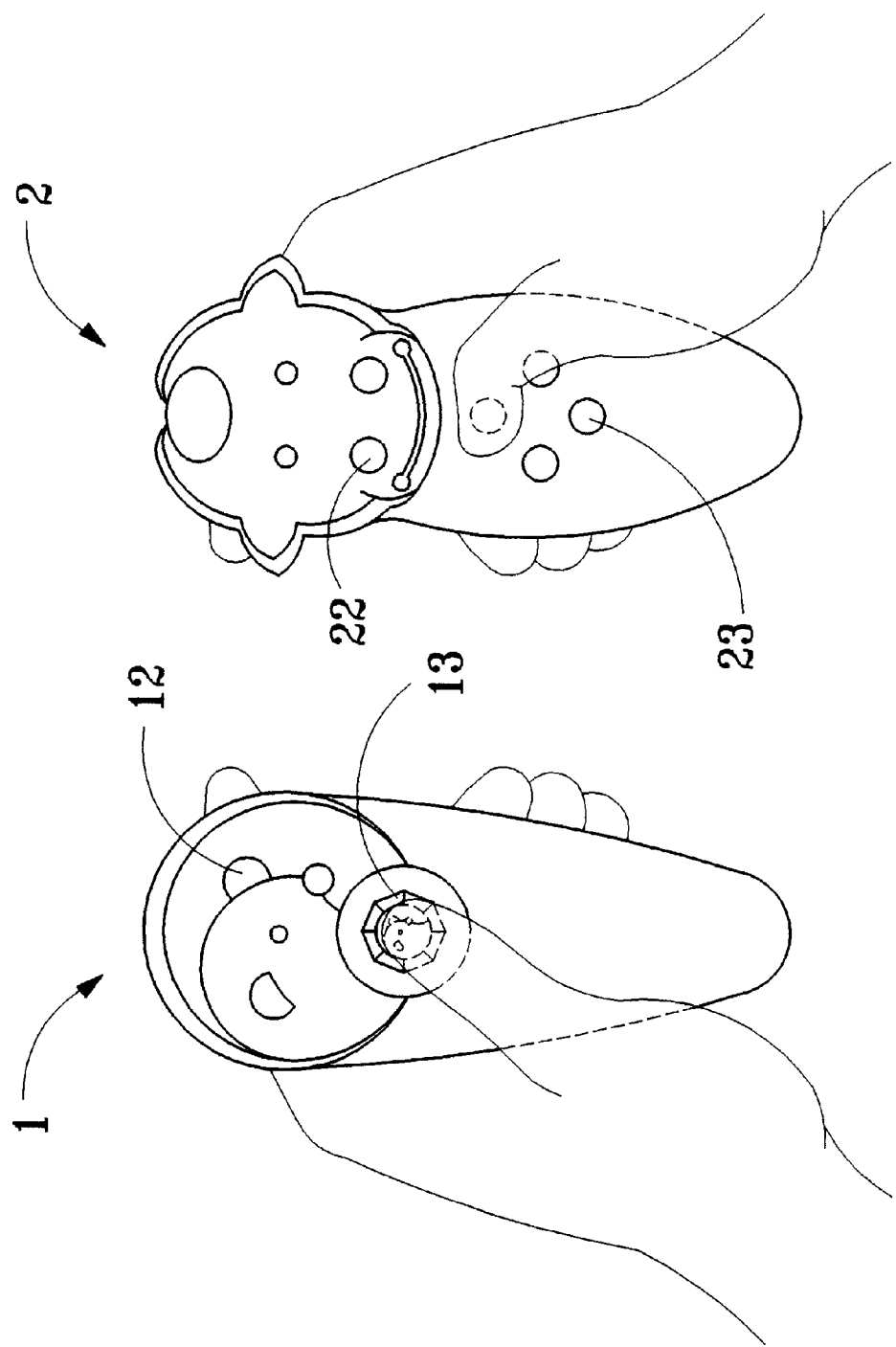
FIG. 5 is an exemplary drawing showing a basic operational mode for the manipulator of the present invention.
Figure 6:
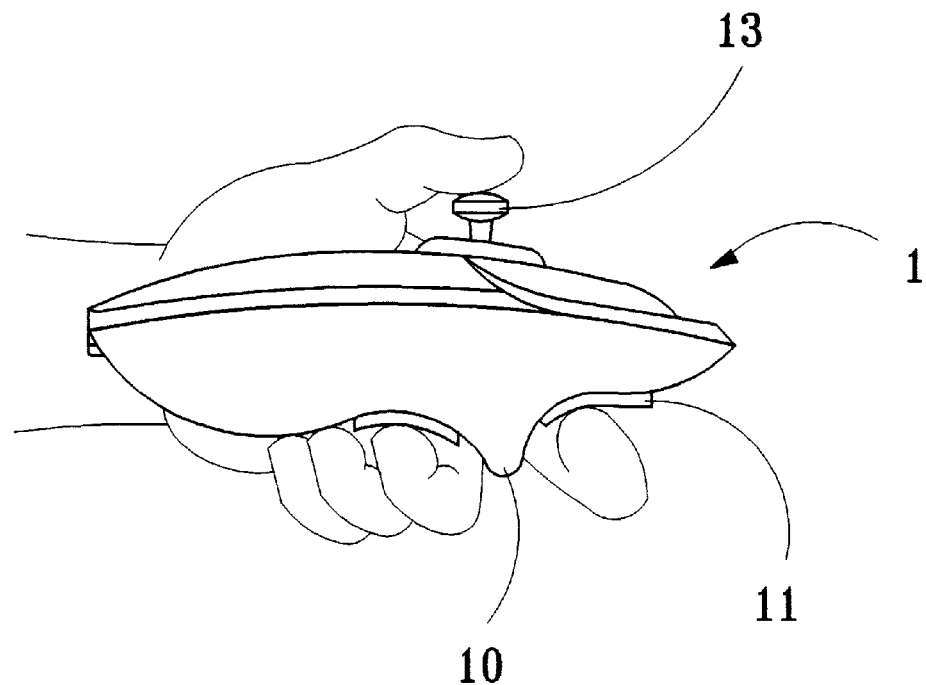
FIG. 6 is a drawing showing operation of the first control module in FIG. 5 of the present invention.
Figure 7:
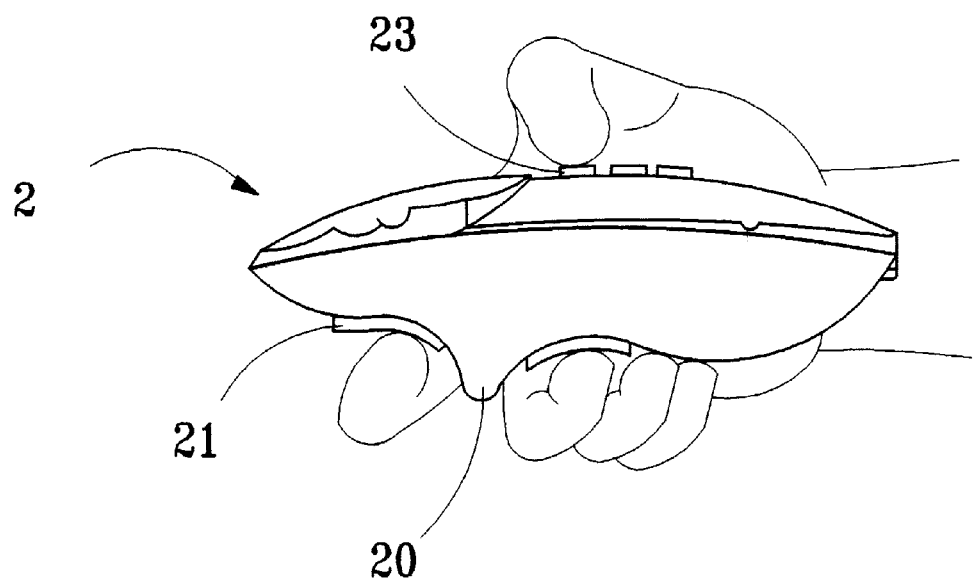
FIG. 7 is a drawing showing operation of the second control module in FIG. 5 of the present invention.

Finally, referring to FIGS. 5,6 and 7 which are all exemplary drawings illustrating basic operational mode for the manipulator of the present invention. As shown in FIG. 5, wherein the first and second control modules 1 and 2 are combined together in a working mode. When in operation, the first control module 1 is held by user left hand with his thumb separated from other four fingers. The thumb is used to operate the rocking bar 13 and manipulate the selecting button 12 at proper time, while except for holding the first control module 1 body, the other four fingers may be employed to operate control buttons 11 for performing various functions. The way of holding and operating the second control module 2 is similar to that of the first control module 1 except the second control module 2 is to be held by the user's right hand. The only difference is that the user's right thumb is to operate the operational button 23. Of course for a user having peculiar habit, or for a left-hander, the position of the first and second control module 1 and 2 may be changed with each other, or the user may appropriately adjust his position of hands without sticking to a defined position to make himself as comfortable as possible. Furthermore, the different modes of display may be obtained by various combination between control modules, for example, the combination of the second and third control modules 2 and 3 demonstrates basic function of control modules, while the combination of the first and second control modules 1 and 2 is specially suitable for displaying the motions such as fighting and shooting which require the use of rocking bar 13. If a game which requires only observing simple moving, the combination of the two first control modules 1 is sufficient for obtaining picture position more accurately. If a very specific function is required, the user may select a combination of the first and third control modules 1 and 3, etc. In conclusion, the user may select any one of the control modules as an indicator for moving direction, and another one for inputting instructions for movement. In addition, the control modules may further increase to associate with the control box to display the motions of a large steering wheel or rocking bar, a pedal (such as a brake, an accelerator), a ski etc. for enlarging the field of application. At the same time, the variety in the figures of control module may also be established required, the user may select a combination of the first and third control modules 1 and 3, etc. In conclusion, the user may select any one of the control modules as an indicator for moving direction, and another one for inputting instructions for movement. In addition, the control modules may further increase to associate with the control box to display the motions of a large steering wheel or rocking bar, a pedal (such as a brake, an accelerator), a ski etc. for enlarging the field of application. At the same time, the variety in the figures of control module may also be established to show novelty and practicability of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A manipulator for controlling TV game sets comprising:

a first control module which being a rocking bar apparatus on which surface there being a rocking bar, two functional buttons being provided in front of the rocking bar, while at the back surface of said first control module two control buttons being installed;

a second control module which being a push button device with two operational buttons provided on its surface, two functional buttons being provided in the front portion of said second control module, while two control buttons being provided on the back surface of said second control module, a third control module which being an indicating device, with an index controller provided on its surface, two functional buttons being installed at the front portion of said third control module, while two control buttons being provided on the back surface of said third control module, a control box being employed as an interface between control modules and the TV game set with a connecting circuit inside it, several module terminals being extended out of said control box for connecting with various control modules;

by means of selecting any one of several control modules described above as an indicator for moving direction, and another one for inputting instructions for movement other than the moving direction, as the manipulator includes a control box and a plurality of replaceable control modules, thus the moving direction indicator and the instructor for movement can be formed of the devices with same category.

2. A manipulator as claimed in claim 1, wherein said first control module is held by an user's hand with his thumb separated from other four fingers, the thumb being for operating said rocking bar or functional buttons, while other four fingers being for holding said first control module body and operating control buttons on its back surface.

3. A manipulator as claimed in claim 1, wherein said second control module is held by an user's hand with his thumb separated from other four fingers, the thumb being for operating operational buttons or functional buttons, while other four fingers being for holding said second control module body and operating control buttons on its back surface.

4. A manipulator as claimed in claim 1, wherein said third control module is held by an user's hand with his thumb separated from other four fingers, the thumb being for controlling said index controller or operating functional buttons, while other four fingers being for holding said third control module body and operating control buttons on its back surface.

5. A manipulator as claimed in claim 1, wherein, profiles of said three control modules may be figured as an animal face, a transportation facility or other artificial are shape for easy holding and beautifying their appearance.

6. A manipulator as claimed in claim 1, wherein the number of functional, control and operational buttons provided by said three control modules may be increased according to actual requirement.

7. A manipulator as claimed in claim 1, wherein said first control module is for Jog shuttle.

8. A manipulator as claimed in claim 1, wherein said first control module is for a steering wheel.

9. A manipulator as claimed in claim 1, wherein the number of control modules may be increased to include additional modules of other functions such as a large steering wheel, a large rocking bar, a pedal( including a brake, an accelerator etc.), or ski for accompanying said control box to increase the content of games.

* * * * *